US011046856B2

(12) United States Patent
Cheng et al.

(10) Patent No.: US 11,046,856 B2
(45) Date of Patent: *Jun. 29, 2021

(54) HOLLOW PARTICLE CRYSTALLINE COLLOIDAL ARRAYS

(71) Applicant: PPG Industries Ohio, Inc., Cleveland, OH (US)

(72) Inventors: Shan Cheng, Cupertino, CA (US); Noel R. Vanier, Wexford, PA (US); Wei Wang, Allison Park, PA (US); Xiangling Xu, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 208 days.

This patent is subject to a terminal disclaimer.

(21) Appl. No.: 16/273,240

(22) Filed: Feb. 12, 2019

(65) Prior Publication Data

US 2019/0185688 A1 Jun. 20, 2019

Related U.S. Application Data

(63) Continuation of application No. 13/241,997, filed on Sep. 23, 2011, now abandoned.

(51) Int. Cl.
C09D 11/101 (2014.01)
B42D 25/328 (2014.01)
B42D 25/387 (2014.01)
B82Y 20/00 (2011.01)
G02B 1/00 (2006.01)
G02B 5/18 (2006.01)
C09D 5/02 (2006.01)

(52) U.S. Cl.
CPC .......... C09D 11/101 (2013.01); B42D 25/328 (2014.10); B42D 25/387 (2014.10); B82Y 20/00 (2013.01); C09D 5/02 (2013.01); G02B 1/002 (2013.01); G02B 5/1861 (2013.01)

(58) Field of Classification Search
CPC ...... G02B 5/18; G02B 5/1809; G02B 5/1828; G02B 5/1838–1861; G02B 2006/1213; G02B 1/005; G02B 1/00; G02B 5/206; G02B 2207/109; G02B 5/0252; G02B 5/1861; C08L 2666/02; C08L 51/003; C08L 51/10; C08L 51/08; C08L 51/085; C08L 67/00; C08L 23/06; C08L 2205/22; C08L 101/02; C08L 25/06; C08L 2666/06; C08L 2666/14; C08L 2666/16; C08L 2205/02; C08L 2207/068; C08L 2207/53; C08L 23/10; C08L 91/00; C09D 5/29; C09D 7/1291; B82Y 20/00; B82Y 40/00

See application file for complete search history.

(56) References Cited

U.S. PATENT DOCUMENTS

| 4,833,172 A | 5/1989 | Schwarz et al. |
| 4,861,644 A | 8/1989 | Young et al. |
| 5,122,905 A | 6/1992 | Wheatley et al. |
| 5,266,238 A | 11/1993 | Haacke et al. |
| 5,281,370 A | 1/1994 | Asher et al. |
| 5,330,685 A | 7/1994 | Panzer et al. |
| 5,527,386 A | 6/1996 | Statz |
| 5,624,731 A | 4/1997 | Desjardins |
| 5,711,884 A | 1/1998 | Asher et al. |
| 5,783,120 A | 7/1998 | Ouderkirk et al. |
| 5,824,733 A | 10/1998 | Döbert et al. |
| 5,854,078 A | 12/1998 | Asher et al. |
| 5,932,309 A | 8/1999 | Smith et al. |
| 6,114,023 A | 9/2000 | Schwarz et al. |
| 6,165,389 A | 12/2000 | Asher et al. |
| 6,187,599 B1 | 2/2001 | Asher et al. |
| 6,299,979 B1 | 10/2001 | Neubauer et al. |
| 6,337,131 B1 | 1/2002 | Rupaner et al. |
| 6,641,973 B1 | 11/2003 | Dontula et al. |
| 6,753,191 B2 | 6/2004 | Asher et al. |
| 6,782,115 B2 | 8/2004 | Decker et al. |
| 6,828,025 B2 | 12/2004 | Ali et al. |
| 6,894,086 B2 | 5/2005 | Munro et al. |
| 7,008,567 B2 | 3/2006 | Foulger et al. |
| 7,217,746 B2 | 5/2007 | Munro et al. |
| 7,291,389 B1 | 11/2007 | Bitler et al. |
| 7,682,530 B2 | 3/2010 | Purdy et al. |
| 8,168,355 B2 | 5/2012 | Purdy et al. |
| 8,289,618 B2 | 10/2012 | Munro et al. |
| 2002/0054680 A1 | 5/2002 | Huang |
| 2002/0143073 A1 | 10/2002 | Jiang et al. |
| 2003/0125417 A1 | 7/2003 | Vanier et al. |
| 2004/0253443 A1 | 12/2004 | Anselmann et al. |

(Continued)

FOREIGN PATENT DOCUMENTS

| EP | 1675437 A1 | 6/2006 |
| WO | 2004063432 A1 | 7/2004 |

(Continued)

OTHER PUBLICATIONS

Endo et al., "Colorimetric detection of volatile organic compounds using a colloidal crystal-based chemical sensor for environmental applications", Sensors and Actuators B, 2007, pp. 589-595, vol. 125.
Fudouzi et al., "Colloidal Crystals with Tunable Colors and Their Use as Photonic Papers", Langmuir, 2003, pp. 9653-9660, vol. 19.
Han et al., "Preparation of poly(3,4-ethylenedioxythiophene) (PEDOT) coated silica core-shell particles and PEDOT hollow particles", Chem. Commun., 2004, pp. 2154-2155.
Hotta et al., "Coated polystyrene particles as templates for ordered macroporous silica structures with controlled wall thickness", J. Mater. Chem., 2003, pp. 496-501, vol. 13.

(Continued)

Primary Examiner — Cara E Rakowski
(74) Attorney, Agent, or Firm — Michael J. Grese

(57) ABSTRACT

The invention includes a radiation diffracting member having a crystalline structure comprising an ordered periodic array of hollow particles. The radiation diffracting member also includes a matrix material in which the array of particles is received.

17 Claims, No Drawings

(56) References Cited

U.S. PATENT DOCUMENTS

| | | |
|---|---|---|
| 2005/0228072 A1 | 10/2005 | Winkler et al. |
| 2006/0137601 A1 | 6/2006 | Miguez et al. |
| 2006/0191442 A1 | 8/2006 | He et al. |
| 2006/0235086 A1 | 10/2006 | Maskaly et al. |
| 2006/0254315 A1 | 11/2006 | Winkler et al. |
| 2007/0100026 A1 | 5/2007 | Munro et al. |
| 2007/0121129 A1 | 5/2007 | Eida et al. |
| 2007/0165903 A1 | 7/2007 | Munro |
| 2008/0188381 A1 | 8/2008 | Xu et al. |
| 2009/0038512 A1 | 2/2009 | Xu et al. |
| 2009/0155545 A1 | 6/2009 | Purdy et al. |
| 2009/0301191 A1 | 12/2009 | Dick et al. |
| 2009/0317623 A1 | 12/2009 | Purdy et al. |
| 2010/0045027 A1 | 2/2010 | Whiteman |
| 2010/0315703 A1 | 12/2010 | Purdy et al. |
| 2010/0328764 A1 | 12/2010 | Munro et al. |
| 2011/0135888 A1 | 6/2011 | Xu et al. |
| 2011/0267677 A1 | 11/2011 | Xu et al. |

FOREIGN PATENT DOCUMENTS

| | | |
|---|---|---|
| WO | 2004098793 A2 | 11/2004 |
| WO | 2006069702 A1 | 7/2006 |

OTHER PUBLICATIONS

Jethmalani et al., "Diffraction of Visible Light by Ordered Monodisperse Silica-Poly(methyl acrylate) Composite Films", Chem. Mater., 1996, pp. 2138-2146, vol. 8.

McDonald et al., "Emulsion Polymerization of Voided Particles by Encapsulation of a Nonsolvent", Macromolecules, 2000, pp. 1593-1605, vol. 33.

Nagao et al., "Preparation of highly monodisperse poly(methyl methacrylate) particles incorporating fluorescent rhodamine 6G for colloidal crystals", Journal of Colloid and Interface Science, 2006, pp. 232-237, vol. 298.

Nakamura et al., "Optical Properties of Colloidal Crystalline Arrays Composed of Hollow Polystyrene Spheres", Journal of Applied Polymer Science, 2007, pp. 2364-2368, vol. 103, Wiley Periodicals, Inc.

Pfaff et al., "Angle-Dependent Optical Effects Deriving from Submicron Structures of Films and Pigments", Chemical Review, 1999, pp. 1963-1981, vol. 99.

Rao et al., "Comparative studies of the physical and hydrophobic properties of TEOS based silica aerogels using different co-precursors", Science and Technology of Advanced Materials, 2003, pp. 509-515, vol. 4.

Sperling et al., "Interpenetrating Polymer Networks", Ini Utracki LA (ed), Polymer Blends Handbook, Dordrecht: Kluwer Academic, 2002, pp. 427-431.

Velev et al., "Porous silica via colloidal crystallization", Nature, 1997, pp. 447-448, vol. 389.

Xu et al., "Mesoscopic Monodisperse Ferromagnetic Colloids Enable Magnetically Controlled Photonic Crystals", J. Am. Chem. Soc., 2002, pp. 13864-13868, vol. 124.

Xu et al., "Superparamagnetic Photonic Crystals", Advanced Materials, 2001, pp. 1681-1684, vol. 13, No. 22.

Xu et al., "Synthesis and Utilization of Monodisperse Hollow Polymeric Particles in Photonic Crystals", J Am. Chem. Soc., 2004, pp. 7940-7945, vol. 126.

Xu et al., "Synthesis and Utilization of Monodisperse Superparamagnetic Colloidal Particles for Magnetically Controllable Photonic Crystals", Chem. Mater., 2002, pp. 1249-1256, vol. 14.

Zeng et al., "Preparation and dynamic viscoelastic properties of strengthened solidified colloidal crystals", Reactive & Functional Polymers, 2002, pp. 39-44, vol. 53.

Zeng et al., "Urea sensing materials via solidified crystalline colloidal arrays", Sensors and Actuators B, 2002, pp. 273-276, vol. 81.

HOLLOW PARTICLE CRYSTALLINE COLLOIDAL ARRAYS

FIELD OF THE INVENTION

This invention relates to crystalline colloidal arrays produced from hollow particles. In particular, this invention relates to a radiation diffracting material exhibiting images comprising a crystalline colloidal array produced from hollow particles.

BACKGROUND OF THE INVENTION

Radiation diffracting materials based on crystalline colloidal arrays have been used for a variety of purposes. A crystalline colloidal array (CCA) is a three-dimensional ordered array of monodispersed colloidal particles, which may be composed of inorganic or organic materials. Colloidal dispersions of particles can form crystalline structures having lattice spacings that are comparable to the wavelength of ultraviolet, visible, or infrared radiation. These structures have been used for filtering narrow bands of selected wavelengths from a broad spectrum of incident radiation while permitting the transmission of adjacent wavelengths of radiation. Other CCAs have been used when fixed in a matrix as colorants, where the fixed array diffracts radiation in the visible spectrum. Such colorant CCAs exhibit a goniochromatic effect when applied to a substrate.

More recently, radiation diffracting materials have been used for producing images with unique optical effects. Such radiation diffracting materials have been proposed for use in security devices for authenticating documents or as security applications. Secure documents, such as bank notes, bonds, checks, and letters of credit, as well as legal documents and identification documents now frequently carry optically active devices, some exhibiting an angularly dependent colored reflection.

SUMMARY OF THE INVENTION

Such security devices in the field of authenticating or security applications are achievable using the radiation diffracting member of the present invention.

The present invention includes a radiation diffracting member having a crystalline structure and an ordered periodic array of hollow particles. The radiation diffracting member also includes a matrix material in which the array of particles is received. The radiation diffracting member is suited for use as a security device when positioned on a surface of a substrate. Also included in the present invention is a method of making a radiation diffracting member comprising receiving an ordered periodic array of hollow particles into a curable matrix composition and curing the matrix composition to fix the array of hollow particles within the matrix material.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids. The term "infuse" and related terms (such as infusion) refer to penetration from a liquid phase.

The present invention includes a radiation diffracting member particularly suited for use in a security device for protecting legal, financial, and identification documents, as well as authenticating articles. The radiation diffracting member exhibits an angle dependent optical effect that is detectable as a diffraction wavelength, which may be in the visible or invisible spectrum. The present invention is primarily described in relation to an optical effect (diffraction) that is visible to the human eye. However, the present invention is not limited to use in diffracting visible light. Other wavelengths of electromagnetic radiation outside the visible spectrum may be diffracted, such as ultraviolet or infrared radiation. The term "wavelength" is meant to include a band of the electromagnetic radiation spectrum, unless specifically stated otherwise. For example, reference to a wavelength of 600 nm may include 595 to 605 nm.

In one embodiment, the radiation diffracting member has a crystalline structure that includes an ordered periodic array of hollow particles received in a polymeric matrix. By ordered periodic array of hollow particles, it is meant an array of hollow particles that diffracts radiation. By hollow particles, it is meant particles that include a shell and define an interior region, which may be filled with air or other low refractive index material. Typically, the hollow particles are generally spherical. The diameter of the particles may be about 100 to 700 nm, and the thickness of the shells may be about 15 to 100 nm. Parallel layers or planes formed by the ordered periodic array of hollow particles interact with incident radiation in accordance with Bragg's law. Radiation striking the radiation diffracting member is diffracted whereby, radiation at a wavelength that meets the Bragg condition (the diffraction wavelength) is reflected by the planes of the particles while the remainder of the radiation is transmitted through the material, as described in U.S. Pat. No. 6,894,086, incorporated herein by reference. By a plane of the particles, it is meant a plane through the radiation diffracting member that passes through the particles, which includes the shells and the material (e.g., air) contained therein. In contrast, a plane through the matrix refers to a plane through the radiation diffracting member that generally passes through substantially only the matrix or, when the particles are closely packed and abut each other through the matrix and a small minor portion of the particles. In the visible spectrum, the diffracted light is goniochromatic, i.e., the color of the reflected radiation depends on the viewing angle. The diffraction wavelength of the light at a given angle is proportional to the distance between the Bragg planes formed by the periodic array of hollow particles, which is proportional to the particle diameter for close-packed spherical particles.

The diffraction wavelength also depends on the effective refractive index of the materials that compose the radiation diffracting member. The effective refractive index of the radiation diffracting member is closely approximated as a volume average of the refractive index of the materials of the radiation diffracting member, including the hollow particles, the material within the particles (e.g., air), and the matrix material surrounding the particles.

The intensity of the diffracted radiation is dependent in part on the number of layers present in the array, with a greater number of layers producing higher diffraction intensity.

The intensity of the diffracted radiation also is dependent on the difference in refractive index between the planes of the particles and the planes of the surrounding matrix. Higher refractive index contrast between these alternating planes (layers) increases diffraction intensity. Higher refractive index contrast between alternating layers can be achieved by using particles and matrix having a relatively large difference in their respective indices of refraction. In addition, directionally expanding the particles and/or the matrix can alter the layered structure and increase the refractive index contrast between the layers. The refractive index of the shell may also vary as a function of the shell thickness in the form of a gradient of refractive index through the shell thickness.

In one embodiment of the present invention, the refractive index of the particle planes is relatively low, particularly when the particles contain only air. For example, the matrix material may have a refractive index of about 1.49 to 1.59 or about 1.55 to 1.59, which may be approximated as the refractive index of a plane taken through the matrix (alone or with a small portion of the particles), referred to as a "high RI plane". A "low RI plane" refers to a plane taken through the hollow particles. For hollow particles containing air (refractive index of 1.0) that are produced from a material having a refractive index of about 1.59, the refractive index of the low RI plane may be about 1.2 to 1.25. In this manner, the refractive index of the high RI planes is greater than the refractive index of the low RI planes, such as about 0.1 to 1.0 greater, or 0.15 to 0.5 greater, or about 0.25 to 0.45 greater, or about 0.35 greater.

The hollow particles may be produced from various compositions, including, but not limited to, organic polymers such as polystyrene, polyurethane, acrylic polymers, alkyd polymers, polyesters, siloxane-containing polymers, polysulfides, epoxy-containing polymers, and inorganic materials such as metal oxides (e.g., alumina, silica, zinc oxide, or titanium dioxide) or composites of these materials.

In one embodiment, the hollow particles are produced by encapsulating solvents, such as hydrocarbon solvents within polymeric particles during an emulsion polymerization process in the presence of a surfactant, yielding a dispersion of charged hollow particles.

Suitable surfactants for dispersion of hollow latex particles include, but are not limited to, sodium dodecylbenzene sulfonate (SDBS), sodium lauryl sulfonate (SLS), DOW-FAX™ surfactants from the Dow Chemical Company, dihexyl sodium sulfosuccinate (commercially available as MA-80 from American Cyanamid Co.), dioctyl sodium sulfosuccinate (commercially available as AOT-75 from Air Products Co.), ammonium alkyl ether sulfate (commercially available as Disponsil FES from Cognis), sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion.

The charged particles are purified from the dispersion by techniques such as ultra-filtration, dialysis, or ion-exchange to remove undesired materials, such as un-reacted monomer, small polymers, water, initiator, surfactant, unbound salt, and grit (agglomerated particles) to produce a monodispersion of charged particles. Ultra-filtration is particularly suitable for purifying charged particles. When the particles are in a dispersion with other materials, such as salts or by-products, the repelling forces of the charged particles can be mitigated; therefore, the particle dispersion is purified to substantially contain only the charged particles, which then readily repel each other and form an ordered array.

The purified dispersion of particles is applied to a substrate and dried. The dispersion of particles applied to the substrate may contain 10 to 70 vol. % of charged particles or 30 to 65 vol. % of charged particles. The dispersion can be applied to the substrate by dipping, spraying, brushing, roll-coating, curtain coating, flow-coating, or die-coating to a desired thickness. The wet coating may have a thickness of 4 to 50 microns, such as 40 microns. Upon removal of the excess raw material, by-products, solvent, and the like, electrostatic repulsion of the charged particles causes the particles to align themselves into an ordered, packed array, where the particles are packed together in a regular structure and may touch each other.

In one embodiment, the dispersion of particles further includes monomers, oligomers, or other polymer precursors of the matrix material that are soluble in the dispersion (water or other solvent). Such monomers or polymer precursors may be present in an amount that aids in binding the array together prior to coating the array with a curable matrix composition, as described below.

The substrate onto which the particles are received may be a flexible material, such as paper or a film (or sheet) of polyester or polyethylene terephthalate (PET), or an inflexible material, such as glass or plastic. By "flexible" it is meant that the substrate can undergo mechanical stresses, such as bending, stretching, compression, and the like, without significant irreversible change. One suitable substrate is a microporous sheet. Some examples of microporous sheets are disclosed in U.S. Pat. Nos. 4,833,172, 4,861,644, and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles, and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume, at least temporarily, of a substrate in at least one direction.

"EVA foam" can comprise open cell foam and/or closed cell foam. "Open cell foam" means that the foam comprises a plurality of interconnected air chambers. "Closed cell foam" means that the foam comprises discrete closed pores. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. Polyurethane substrates, according to the present invention, include aromatic, aliphatic and hybrid (hybrid examples are silicone polyether or polyester urethane and silicone carbonate urethane) polyester or polyether based thermoplastic urethane. By "plastic" it is meant any of the common thermoplastic or thermosetting synthetic materials, including thermoplastic olefins ("TPO") such as polyethylene and polypropylene and blends thereof, thermoplastic urethane, polycarbonate, sheet molding compound, reaction-injection molding compound, acrylonitrile-based materials, nylon, and the like. A particular plastic is TPO that comprises polypropylene and EPDM (ethylene propylene diene monomer).

The dried array of particles on a substrate is received within a polymeric matrix by applying a curable matrix composition, such as an ultraviolet (UV) curable composition, to the array of particles thereby interpenetrating the interstices between the particles with the curable matrix composition. The curable matrix composition includes monomers, oligomers, and/or other polymer precursors referred to collectively herein as polymer precursor material, which is then cured to fix the array within the cured matrix. Suitable materials for the matrix include: acrylic polymers, polystyrene, polyurethane, alkyd polymers, polyester, siloxane-containing polymers, polysulfides, epoxy-containing polymers, and polymers derived from epoxy-containing polymers. In one embodiment, the curable matrix composition is placed on a support and the array of particles is embedded therein. Alternatively, as disclosed in U.S. Pat. No. 6,894,086, the curable matrix composition material may be coated onto the dried array of particles via dipping, spraying, brushing, roll-coating, gravure coating, curtain coating, flow-coating, slot-die coating, or ink-jet coating. By embedding or coating, it is meant that the curable matrix composition covers the entirety of the array and fills the interstitial spaces between the particles, with the particles remaining packed adjacent to each other. The matrix composition is cured (such as by exposure to UV radiation) to fix the array of packed particles within the matrix. Other curing mechanisms may be used to fix the array of particles in the matrix.

Upon interpenetration of the array with the fluid curable matrix composition, some of the polymer precursor material of the curable matrix composition may diffuse into the shells, thereby increasing the particle diameters. Solvent may also diffuse into the shells and create swelling. The solvent is ultimately removed from the array, but this swelling from solvent may impact the final dimensions of the particles. The degree of swelling of the particles may be controlled by controlling the length of time allowed for interpenetration of polymer precursor materials into the shells and/or by heating the material to enhance the diffusion rate at which the swelling components diffuse into the shells. Upon curing of the curable matrix material, the relative positions of the particle centers may be fixed such that the inter-particle spacing is fixed.

The radiation diffracting member of the present invention is non-gelatinous and substantially solid. By "non-gelatinous", it is meant that the radiation diffraction component does not contain a fluidizing material, such as water, and is not a hydrogel, nor produced from a hydrogel. In certain embodiments, the radiation diffraction component of the present invention substantially only includes the particles and the polymeric matrix with some possible residual solvent and, thus, is substantially solid. The volumetric ratio of the particles to the polymer matrix in the radiation diffracting materials is typically about 25:75 to about 80:20.

The radiation diffracting member may diffract radiation at a single wavelength or a plurality of wavelengths, such as to exhibit an image. A radiation diffracting member that diffracts at a single wavelength may generally exhibit a single goniochromatic effect, such as appearing one color when viewed normal to the component and another color when viewed at a glancing angle to the component. A radiation diffracting member that diffracts at a plurality of wavelengths may appear multi-colored at both viewing angles.

For example, a plurality of diffraction wavelengths may be produced by using a plurality of radiation diffracting members. For example, a radiation diffraction component exhibiting two colors of diffracted visible light at a particular viewing angle may be produced by providing a first radiation diffracting member having a first array of particles yielding a first color appearance (e.g., red) and applying thereto, in a partially overlapping manner, a second radiation diffracting member having a second array of particles with a smaller particle size yielding a second appearance (e.g., green).

Alternatively, a single radiation diffracting member that diffracts at a plurality of wavelengths may be produced by altering the diffraction wavelength at discreet regions thereof.

For example, a portion of the radiation diffracting member may be treated to shift (generally, increase) the diffraction wavelength in that portion. A shift in the diffraction wavelength can be achieved by urging the particles apart thereby increasing the inter-particle distance, the distances between planes of the particles being proportional to diffraction wavelength. Alternatively, the particle size (diameters) may be increased to increase the inter-particle distance. In addition, the effective refractive index of the radiation diffracting member (the effective refractive index of the radiation diffracting member being proportional to the diffraction wavelength) may be altered.

The inter-particle spacing may be increased by increasing the dimensions of the particles so that the centers of the particles are further spaced apart from each other or by expanding the matrix composition to urge the particles away from each other. In either case, the distances between the centers of the particles, referred to herein as the inter-particle spacing, is altered, which alters the distances between Bragg planes within the array. The particle dimensions may be increased by diffusing materials into the particles, such that the particles expand, thereby increasing the inter-particle spacing. The diffusion rate may be enhanced with heating.

For a curable matrix composition containing polymer precursor material, the polymer precursor materials may diffuse into the particles. Alternatively, a diffusible composition (such as a solvent) may be applied to the radiation diffraction component for diffusing into and expanding the particles. In another embodiment, the matrix may be expanded by addition of monomers or a solvent (water or organic solvents) to swell the matrix composition (with or without expansion of the particles) and increase the inter-particle spacing. Alteration of the inter-particle spacing by diffusion of material into the particles and/or expansion of the matrix may also affect the refractive index contrast between the particles and the matrix, the refractive index contrast between alternating layers in the array, and/or the effective refractive index of the radiation diffracting member.

Following alteration of the inter-particle spacing, refractive index contrast, and/or effective refractive index, the matrix composition is cured. Curing of the matrix composition fixes the relative positions of the particles in the radiation diffracting member.

The inter-particle spacing may be altered in more than one portion of the radiation diffracting member according to another embodiment of the invention. Likewise, the refractive index contrast and effective refractive index may be different in discreet regions due to variations in the matrix material, as described below. In one embodiment, an array of particles is received within a curable matrix and a first portion of the radiation diffraction component is exposed to actinic radiation to at least partly cure the matrix composition in the first portion. The inter-particle spacing is altered in one portion to create a second portion in the radiation diffracting member that diffracts radiation differently from the first portion of the radiation diffracting member. This process of exposing one portion with uncured matrix composition to actinic radiation and altering the inter-particle spacing in another portion may be repeated several times before a final step of curing any remaining uncured portion of the matrix composition. With each subsequent alteration of the inter-particle spacing, the altered portion, when cured, diffracts radiation at a different wavelength from the other portions of the radiation diffracting member. In this manner, the radiation diffracting component can exhibit a plurality of diffraction wavelengths, which may appear as a multi-colored image therein.

For example, a first portion of the radiation diffraction component may be exposed to actinic radiation by use of a mask or by focused laser radiation. In one embodiment, when the matrix composition is curable with ultraviolet (UV) radiation, such as an acrylate-based composition, the actinic radiation used to cure the matrix composition includes UV radiation. The mask may include openings in a desired configuration of an image and may be laid over the radiation diffraction component having an array of particles provided in a curable matrix composition. The radiation diffraction component is exposed to actinic radiation through the openings in the mask to at least partially cure the exposed portions. The inter-particle spacing between the particles in the at least partially cured portion is altered, such as by applying additional curable matrix composition thereto. The additional curable matrix composition includes monomers and/or polymer precursor materials that cause the at least partially cured matrix to expand, thereby altering the refractive index contrast as well as increasing the inter-particle distance and the resulting wavelength of diffraction. The radiation diffraction component is exposed to actinic radiation to fully cure all portions.

The openings in a mask used for imaging in a radiation diffraction member of the present invention may correspond to the image such that a first cured portion exhibits the image. Alternatively, the openings may correspond to a negative of the image, such that the first cured portion of the imaged radiation diffracting member constitutes the background of the image. In either case, the imaged radiation diffracting member exhibits an image due to differences in the diffraction wavelength between the first cured portion and the other cured portion. By "different wavelengths", it is meant that there is a discernable difference in the wavelength or band of wavelengths diffracted by the two portions of the imaged member. The difference in diffraction wavelength may be visible to the human eye or may be detectable by an optical device, such as a spectrophotometer or the like.

The refractive index contrast and effective refractive index may be varied within the radiation diffracting member by applying different matrix material in discreet regions. For example, the array of particles may be interpenetrated with a first curable matrix composition, which is exposed to actinic radiation through a mask to at least partly cure the first matrix composition in a first portion of the radiation diffracting member. A second curable matrix composition is then applied to the radiation diffracting member, interpenetrating the remaining portion of the radiation diffracting member (i.e., not the first portion), which is then exposed to actinic radiation and cured. The step of applying curable matrix composition and curing through a mask to alter the matrix material may be repeated several times before a final curing step of any remaining uncured matrix composition. The resulting radiation diffracting member includes regions having only the first matrix material therein and other regions having both the first and second matrix materials therein. The regions of different matrix material diffract radiation at different wavelengths, such that the radiation diffracting member exhibits a plurality of diffraction wavelength, which can appear as a multi-colored image.

In a related embodiment, a highly detailed image may be produced in the radiation diffracting member by using a transparency bearing a grey-scale negative image. The grey-scale negative image may be produced by converting a full-color image to a grey-scale negative image, which is then reproduced onto a transparency that functions as a mask. Actinic radiation passes through the transparency where there is no image negative, thereby curing a first portion of the matrix composition in the configuration of the image. The areas of the uncured portion of the matrix composition may constitute the background of the image. The inter-particle spacing in the uncured portion is altered so that the inter-particle spacing in the uncured portion is different from the inter-particle spacing of the first cured portion, and then the other portion is cured.

Alternatively, one or more lasers may provide actinic radiation to produce an image in a radiation diffracting member. Movement of the laser across the radiation diffracting member creates a path of cured matrix composition corresponding to an image portion following the pattern of movement of the laser. A plurality of lower-intensity lasers may be focused at a common location to provide sufficient actinic radiation at the location for curing of the matrix composition. The plurality of lower-intensity lasers may be moved across the array of the curable matrix in a similar manner as the single laser.

In another embodiment, an image is produced by printing an imaging composition onto a portion of an ordered periodic array of particles and fixing the printed array in a matrix material, resulting in a radiation diffracting member for use in the present invention. Any suitable printing technique may be used, such as xerographic printing, ink jet printing, flexographic printing, silk screening, gravure printing, or intaglio printing. The printed portion may correspond to an image with the remaining portion that was not printed serving as a background. Alternatively, the printed portion may be a background to an image produced in the remaining portion. The imaging composition shifts the diffraction wavelength and/or changes the refractive index of the printed portion of the array, such that the difference in optical properties between the printed portion and a remainder of the member is detectable as an image. The image is detectable by exposing the imaged component to radiation and detecting radiation reflected from the imaged component as an image.

The imaging composition may be a curable matrix composition comprising polymer precursor material as described above. The imaging composition is printed onto the ordered periodic array of particles in the configuration of an image. The imaging composition fills the interstitial gaps between the particles in the array in the location of printing (the printed portion), which may urge the particles in the printed portion apart from each other and change the inter-particle spacing, thereby shifting the Bragg conditions and the resulting diffraction wavelength. The imaging composition also may diffuse into the particles, thereby swelling the particles and further increase the inter-particle spacing. The imaging composition also shifts the refractive index difference between the alternating planes in the printed portion, thereby changing the refractive index contrast and intensity of reflected radiation in the printed portion.

Diffusion of the imaging composition into the particles may be enhanced by heating the array to increase the rate of diffusion of materials from the imaging composition into the particles. The imaging composition may also include a solvent to enhance the rate and/or concentration of polymerized components diffusing into the particles.

The printed array having an image printed thereon may be coated with a curable clearcoat composition similar to the composition disclosed in U.S. Pat. No. 6,894,086 (incorporated herein by reference) to interpenetrate the array of particles with the curable clearcoat composition, which is then cured. By coating, it is meant that the curable matrix composition covers at least substantially the entirety of the array and at least in part fills the interstitial spaces between the particles. The curable clearcoat composition may be applied by spraying, brushing, roll-coating, gravure coating, curtain coating, flow-coating, slot-die coating, xerographic printing, ink jet printing, flexographic printing, silk screening, gravure printing, intaglio printing, or the like. The coated array is subjected to curing, such as by UV radiation, to polymerize the monomers of the imaging composition as well as the clearcoat composition. Alternatively, curing of the imaging composition and clearcoat composition may be conducted in separate steps. The resulting imaged radiation diffracting member includes a printed portion that received the imaging composition and a background portion that did not receive the imaging composition. The printed portion of the imaged radiation diffracting member diffracts radiation at a different wavelength from the background portion and at a different intensity of reflection than the background portion.

Alternatively, an ordered periodic array of particles may be printed with an imaging composition to alter the inter-particle spacing and/or refractive index of the printed portion as described above and is cured prior to applying any subsequent coatings in order to fix the printed portion of the array. The cured printed array is then overcoated with a coalescing composition that coalesces the particles in the background portion, rendering the background portion substantially unable to diffract radiation, and may appear substantially colorless. Suitable coalescing compositions include organic solvents or low molecular weight monomers. By "substantially colorless", it is meant that the background portion does not exhibit color that is discernable to the naked eye, but may appear transparent, semi-transparent, or opaque depending upon the degree of coalescence. The printed array with coalesced background portion may be used as an imaged member as is, or it may be overcoated with a clearcoat coating composition as described above. The imaged radiation diffracting member may be used in place on the substrate or may be removed therefrom as a self-supporting film for use on another support.

Instead of coalescing the background portion, the cured printed array may be treated so as to disturb and/or remove the particles in the background portion to prevent the background portion from diffracting radiation. An ordered periodic array of particles may be disturbed by various techniques including, for example, by applying a solvent to the array that at least partially dissolves the particles or by mechanically disrupting the particles. The disturbed particles may be removed from the cured printed array, such that only the imaged portion of the array remains intact. The cured printed array with removed (or disturbed) background portion may be used as an imaged member as is or it may be overcoated with a clearcoat coating composition as described above. The imaged radiation diffracting member may be used in place on the substrate or may be removed therefrom as a self-supporting film for use on another support.

In general, a radiation diffracting member as used in the present invention exhibits specular reflection from the major opposing surfaces thereof. Even though the radiation diffracting member diffracts radiation whereby a diffraction wavelength is reflected therefrom, the major surfaces have a mirror-like appearance, which masks the diffraction wavelength. The image in the radiation diffracting material may be slightly visible in the observed specular reflection, but for the purposes of the present invention, such minimal visibility of an image is considered to be essentially invisible. Thus, as used herein, "invisible" means the image is not colored or clearly visible to the human eye, even when some portion thereof may be detected via specular reflection.

However, when the radiation diffracting member is placed over a dark surface, i.e., a radiation absorbing surface, substantially all wavelengths of visible radiation are absorbed, except the diffraction wavelength. As a result, the reflected light at the diffraction wavelength is visible as colored reflection. The visible reflection may appear as a solid color (no image) or as a multi-colored image. In either case, the radiation diffracting member also exhibits goniochromicity, wherein the diffraction wavelength shifts with viewing angle.

In use, the radiation diffracting member of the present invention may be produced on any support such as a polyethylene terephthalate film such as Mylar® polyester film. The support may be provided on one exposed surface of the composite material or may be provided on both exposed surfaces thereof in a sandwich arrangement. The support may provide a carrier for transferring the radiation diffracting member to an article. In addition, the radiation diffracting member may be produced in sheet-like form with a support on opposing major surfaces thereof and may subsequently be cut into patches or threads for incorporation into or adherence to an article. In other embodiments, the radiation diffracting member may be produced directly on an article. In addition the uppermost surface of the composite material may be covered with a protective coating such as an abrasion-resistant coating.

The radiation diffracting member produced according to the present invention may be applied to an article or other physical structure by a variety of techniques, such as using adhesives to attach a film bearing the composite material to an article (as a decal or the like) or by hot stamping a film bearing a composite material or delivering a composite material to an article. Suitable non-limiting techniques for delivering a radiation diffracting member to an article include providing the radiation diffracting member in a medium and applying the medium containing the radiation diffracting member to an article by brushing, spraying, wiping, dipping, sprinkling, electrodepositing, powder spraying, aerosol spraying, slot-die coating, gravure coating, roll-coating, and printing (such as with a jet printer). The radiation diffracting member may be incorporated into an article by soaking an article with a medium (e.g., solvent or dispersant) containing the radiation diffracting member, wherein the radiation diffracting member soaks into and is incorporated into the article. The radiation diffracting member may be incorporated into woven articles (such as currency) by weaving threads bearing the composite material into the woven material. Alternatively, the radiation diffracting member may be compounded into material for producing the article (such as a resinous material or pulp-type material). The article may be molded (including injection-molding) or extruded (including hot melt extrusion), whereby the radiation diffracting member is co-extruded with the article forming material. The radiation diffracting member of the present invention may also be provided on or incorporated into heat-shrinkable sleeves for wrapping around articles. Alternatively, the article itself may serve as a substrate by applying the radiation diffracting member directly to the housing of the article, such as the housing of electronic devices, or directly to goods such as athletic equipment, accessories, optical lenses, optical frames, clothing, including shoes, and the like.

The radiation diffracting member may be used in marking devices, including documents of value, articles of manufacture and their packaging, and credentials documents. Examples of documents of value include: currency, credit cards, compliance certificates, collectors' items and trading cards, deeds, titles or registrations (e.g., automotive), compliance decals, tickets (e.g., travel, events, or parking), tax stamps, coins, postage stamps, checks and money orders, stationary, lottery tickets, chips and/or tokens, controlled items (e.g., evidence), key cards, keys, tracing and tracking items, and as a portion of barcodes. Articles of manufacture or packaging of articles of manufacture may include: aircraft parts, automotive parts such as vehicle identification numbers, pharmaceutical products and personal care products, recorded media, clothing and footwear, electronic devices, batteries, ophthalmic devices, alcohol, food items, printing inks and printing consumables, writing implements, luxury items such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. Examples of credentials which may bear the composite material produced according to the present invention include: drivers' licenses, identification cards (e.g., government, corporate and educational) passports, visas, marriage certificates, hospital bracelets, and diplomas. These examples are not meant to be limiting and are only a sampling of devices that may bear the composite material of the present invention.

The following examples are presented to demonstrate the general principles of the invention. The invention should not be considered as limited to the specific examples presented. All parts are by weight unless otherwise indicated.

EXAMPLES

Example 1

Latex Hollow Particles

A hollow latex with a particle diameter of 185 nm and a void diameter of 108 nm (as measured by transmission electron microscopy) was prepared in a water/methanol blend according to the two-stage procedure described in McDonald et al., Macromolecules, 2000, 33, 1593-1605. The monomer and hydrocarbon composition of the latex is given in Table 1.

TABLE 1

| Stage | Component | Wt. % |
|---|---|---|
| Encapsulation (polymerization) | styrene | 24.7 |
| | methacrylic acid | 4.1 |
| | isooctane | 21.9 |
| | t-dodecyl mercaptan | 1.4 |
| Stabilization (crosslinking) | styrene | 42.2 |
| | divinyl benzene | 5.8 |

Example 2

UV Curable Coatings

Three UV curable coating compositions were prepared for use as matrix materials. The coating compositions were prepared by mixing the components listed in Table 2 in separate amber containers.

TABLE 2

| UV Curable Coating Composition | Component | Weight (g) |
|---|---|---|
| I | propoxylated neopentyl glycol diacrylate[1] | 5.00 |
| | diphenyl(2,4,6-trimethylbenzoyl)phosphine oxide/2-hydroxy-2-methylpropiophenone, 50/50 mix by weight[2] | 0.20 |
| II | octafluoropentyl acrylate | 5.96 |
| | ethoxylated trimethylolpropane triacrylate[3] | 3.53 |
| | pentaerythritol tetraacrylate[4] | 0.50 |
| | diphenyl(2,4,6-trimethylbenzoyl)phosphine oxide/2-hydroxy-2-methylpropiophenone, 50/50 | 0.25 |
| III | octafluoropentyl acrylate | 5.96 |
| | pentaerythritol tetraacrylate | 3.00 |
| | propoxylated neopentyl glycol diacrylate | 0.96 |
| | diphenyl(2,4,6-trimethylbenzoyl)phosphine oxide/2-hydroxy-2-methylpropiophenone, 50/50 | 0.55 |

[1]SR9003, from Sartomer Company, Inc.
[2]Photoinitiator from Sigma-Aldrich Co. LLC.
[3]SR415, from Sartomer Company, Inc.
[4]SR295, from Sartomer Company, Inc.

Example 3

The latex hollow particle dispersion of Example 1 was applied onto a piece of polyethylene terephthalate (PET) film, and spread with a wire-wound drawdown bar. Upon drying under ambient conditions, a crystalline colloidal particle array formed on the PET film. Onto another piece of blank PET film, a few drops of UV coating I were added. The PET film bearing the latex particle array was applied onto the UV coating I by facing the latex particle array to the UV coating I. The UV coating was spread with a hand roller. To cure the UV coating composition, the assembly was exposed to LED UV light (Clearstone Technologies, JL1-395-42, operated at 50% intensity and 3.5 inches height for 10 seconds). After curing the coating composition, when viewing the assembly face on (normal to the assembly), the assembly appeared bluish-purple. Spectrophotometer (Carry 500 Scan) measurement showed that the reflectivity of the assembly was 70 to 75% with maximum peak height at about 430 nm.

Example 4

The latex hollow particle dispersion of Example 1 was applied onto a piece of PET film and spread with a wire-wound drawdown bar. Upon drying under ambient conditions, crystalline colloidal particle array formed on the PET film. A few drops of UV coating II were placed onto another piece of blank PET film. The PET film bearing latex particle array was applied onto the UV coating II by facing the latex particle array to the UV coating II. The UV coating II in the assembly was spread with a hand roller.

To produce an image, an opaque image pattern paper was placed on top of the assembly, and then the assembly was exposed to LED UV light (Clearstone Technologies, JL1-395-42, operated at 6% intensity and 2 inches height for 1 second). A few drops of UV coating III were placed onto a second piece of blank PET film. The image pattern paper was removed and the covering PET film on the assembly was peeled off. The film with the latex particle array was then applied onto the PET film with the UV coating III by facing the latex particle array to the UV coating III. The UV coating III in the assembly was spread with a hand roller. To fully develop the image and cure the matrix completely, the assembly was exposed to LED UV light (Clearstone Technologies, JL1-395-42, operated at 50% intensity and 2 inches height for 10 seconds). When viewing the cured assembly face on over a piece of black paper, the image pattern appeared blue with the background appearing green.

The invention claimed is:

1. A method of making a coating composition comprising:
   (i) producing an interference-effect composition comprising a radiation diffracting member by:
      receiving an ordered periodic array of hollow particles into a curable matrix composition; each hollow particle comprising a shell produced from a shell material and defining an interior region comprising air;
      curing the matrix composition to fix the array of hollow particles within a polymeric matrix material, the matrix material being different from the shell material; and
   (ii) adding the radiation diffracting member to a film-forming material, wherein the film-forming material enables the coating composition to be applied to a surface,
   wherein the array of hollow particles is produced by applying a dispersion of similarly charged, monodispersed hollow particles onto a substrate and drying the dispersion, whereby the hollow particles pack into the ordered periodic array,
   wherein the radiation diffracting member is produced by:
      receiving the ordered periodic array of particles into a first curable matrix composition;
      curing a first portion of the first curable matrix composition to produce a partially cured assembly;
      receiving the partially cured assembly within a second curable matrix composition; and
      curing the second curable matrix composition.

2. The method of claim 1, where the radiation diffracting member has
   (b) a crystalline structure.

3. The method of claim 2, wherein the crystalline structure defines a plurality of first planes through the hollow particles and a plurality of second planes spaced from the first planes, wherein the effective refractive index of the material in the second planes is at least 0.15 greater than the effective refractive index of the material in the first planes.

4. The method of claim 2, wherein the crystalline structure defines a plurality of planes, wherein a refractive index of at least one plane passing through the hollow particles is between about 1.2 and 1.25, and wherein a refractive index of at least one plane passing through the polymeric matrix material is between about 1.49 and 1.59.

5. The method of claim 1, wherein the hollow particles comprise polystyrene, polymethyl methacrylate, acrylonitrile, divinyl benzene, polyurethane, acrylic polymer, alkyd polymer, polyester, siloxane-containing polymer, polysulfide, epoxy-containing polymer, and/or polymer derived from an epoxy-containing polymer.

6. The method of claim 1, wherein the hollow particles comprise a crosslinked polymer, wherein the crosslinked polymer comprises polystyrene.

7. The method of claim 1, wherein the matrix material comprises styrene, divinyl benzene polyurethane, acrylic polymer, alkyd polymer, polyester, siloxane-containing polymer, polysulfide, epoxy-containing polymer, and/or polymer derived from an epoxy-containing polymer.

8. The method of claim 1, wherein the radiation diffracting member exhibits an image comprising at least two regions that reflect radiation at two different wavelengths in said regions.

9. The method of claim 8, wherein the matrix materials in each of said at least two regions differ from each other.

10. The method of claim 1, wherein the radiation diffracting member exhibits an image detectable in the visible spectrum.

11. A security device comprising:
    a substrate; and
    a coating composition prepared according to the method of claim 1 positioned on a surface of the substrate.

12. The security device of claim 11, wherein the substrate comprises a support member.

13. The security device of claim 11, wherein the support member comprises a film.

14. The security device of claim 11, wherein the support member comprises a microporous layer.

15. The security device of claim 11, wherein the support member comprises an article.

16. The security device of claim 15, wherein the article comprises a document of value or a credentials document.

17. The method of claim 1, wherein the ordered periodic array of particles is received into at least two different curable matrix compositions.

* * * * *